United States Patent [19]

Wan

[11] Patent Number: 4,822,699

[45] Date of Patent: Apr. 18, 1989

[54] ELECTROCATALYST AND FUEL CELL ELECTRODE USING THE SAME

[75] Inventor: Chung-Zong Wan, Somerset, N.J.

[73] Assignee: Engelhard Corporation, Menlo Park, N.J.

[21] Appl. No.: 451,696

[22] Filed: Dec. 20, 1982

[51] Int. Cl.[4] .................... H01M 4/86; B01J 23/40; B01J 23/42

[52] U.S. Cl. .................... 429/40; 252/185; 252/334

[58] Field of Search .................... 429/40; 502/185, 334

[56] References Cited

U.S. PATENT DOCUMENTS

| | | | |
|---|---|---|---|
| 2,814,599 | 11/1957 | Lefrancois et al. | 502/328 X |
| 3,511,714 | 5/1970 | Bocciarelli | 429/40 X |
| 3,997,429 | 12/1976 | Rashkin | 502/226 X |
| 4,127,468 | 11/1978 | Alfenaar et al. | 429/40 X |
| 4,186,110 | 1/1980 | Jalan et al. | 429/40 X |
| 4,192,907 | 3/1980 | Jalan et al. | 429/40 |
| 4,202,934 | 5/1980 | Jalan | 429/40 |
| 4,224,192 | 9/1980 | Foster et al. | 502/334 X |
| 4,469,812 | 9/1984 | Sorrentino et al. | 502/327 X |

OTHER PUBLICATIONS

Chemical Abstracts: 79:81337.
Chemical Abstracts 82:142529.
Chemical Abstracts 90:157570.

*Primary Examiner*—Brian E. Hearn
*Assistant Examiner*—S. J. Kalafut

[57] ABSTRACT

An improved electrocatalyst comprises a supported platinum-gallium alloy catalyst of up to 50 atomic percent gallium, preferably of 10 to 30 atomic percent gallium, balance platinum. The platinum-gallium alloy is supported, preferably on carbon powder or the like, shows greater activity for oxygen reduction and better resistance to sintering than does a comparable platinum catalyst. A fuel cell electrode especially suited for use as a phosphoric acid fuel cell cathode comprises the supported platinum-gallium alloy electrocatalyst bound to an acid resistant support member.

23 Claims, No Drawings

ELECTROCATALYST AND FUEL CELL ELECTRODE USING THE SAME

BACKGROUND OF THE INVENTION

The present invention relates to platinum group metal alloy electrocatalysts and to fuel cell electrodes utilizing such electrocatalysts. More specifically, the present invention concerns platinum-gallium alloy electrocatalysts and acid electrolyte fuel cell cathodes utilizing the same.

Generally speaking, a fuel cell is an electrochemical device for obtaining direct conversion of a fuel, such as hydrogen or a hydrocarbon, and an oxidant, such as oxygen, to a low voltage DC current. Typically, such cells comprise fuel electrodes (anodes), oxidant electrodes (cathodes), an electrolyte between the electrodes, and means for separately introducing fuel and oxidant streams to, respectively, the anodes and cathodes.

In operation, the fuel is oxidized at the anode in contact with an electrocatalyst and in the presence of the electrolyte, and results in liberation of electrons. Oxygen or an oxygen-containing gas such as air is fed to the cathode, where it is reduced at the electrocatalytic surface in the presence of the electrolyte, with corresponding consumption of electrons which have been transferred from the anode via an external circuit. The electron flow from the anode to the cathode constitutes a direct current electrical potential which can be usefully applied as such to perform tasks, or converted to alternating current.

Generally speaking, the "platinum group metals" of Group VIII of the Periodic Table, i.e., platinum, palladium, rhodium, ruthenium, iridium, and osmium, or combinations of two or more thereof, have found use as oxygen reduction catalysts and may also be useful as fuel (hydrocarbon or hydrogen) oxidation catalysts. Alloys of such platinum group metals, such as alloys with metals of Group IB of the Periodic Table or other metals, are known for such use. The metal catatyst is usually a supported metal catalyst, that is, the metal is supported on a carrier material such as conductive carbon black powder.

A variety of materials for the support member on which the catalyst is deposited to form the cell electrodes have been utilized with varying degrees of success. Support members made of metal, such as nickel, for instance, can be used to make a metal electrode by securing the catalyst particles onto the support member. Such metal electrodes are permeable to gaseous fuel, such as hydrogen, and are relatively easy to fabricate. They are, however, susceptible to corrosive attack by strong acid electrolytes, such as phosphoric acid, causing shortened life, substantial maintenance expense and attendant variations in electrical output. Carbon electrodes having platinum group metal catalysts applied thereon have been used with some success.

When platinum group metal-containing carbon-supported catalyst compositions are employed as the electrocatalyst of the cathodes of a phosphoric acid fuel cell system, (See *J. Electrochem Soc.* 127 1219, 1980), the surface area of the metal catalyst tends to progressively decrease. This shortens the effcient operating life span of the electrode and necessitates the added expense and inconvenience of built-in over-capacity to accommodate the anticipated decline. The surface area reduction problem is sometimes referred to as "sintering", and is believed to be caused by the migration of small platinum group metal (e.g., platinum) crystallites across the cathode surface, which causes the crystallites to form larger crystallite masses. The resulting loss of active metal surface area is correlated to progressive loss in cell output and overall efficiency.

Previous attempts at improving electrode catalysts for use in fuel cells in general have included the preparation of an alloy of a platinum group metal with various base metals such as vanadium, tungsten, aluminum, titanium, silicon, cerium, strontium, or the like. See U.S. Pat. Nos. 4,202,934 and 4,186,110. Other attempts have included the deposition of a plurality of metal salts on a support and reduction of the salts to the metals; see U.S. Pat. No. 3,340,097.

SUMMARY OF THE INVENTION

In accordance with one major aspect of the present invention, there is provided a platinum group metal electrocatalyst comprising a platinum-gallium alloy of up to about 50, preferably about 5 to 50, more preferably about 10 to 30 atomic percent gallium, dispersed on a suitable carrier. In a still more preferred aspect, the balance of the alloy comprises platinum.

The term "electrocatalyst" as used herein and in the claims means a catalyst for catalyzing oxidation and reduction electrode reactions, specifically oxygen reduction (at a cathode) and hydrogen (or other fuel) oxidation (at an anode). The electrocatalyst of the invention has particular utility for the catalytic reduction of oxygen. The terms catalyst and electrocatalyst are used interchangeably herein.

Preferred aspects of the invention provide that the carrier may comprise carbon, and that the platinum-gallium alloy may have a surface area of at least about 30 $m^2/g$, preferably at least about 60 $m^2/g$, and may comprise about 0.1 to 30% by weight of the total weight of the alloy plus carrier.

In accordance with one major aspect of the invention, there is provided an electrode, eg., a cathode, for an acid electrolyte fuel cell, the electrode comprising a platinum group metal alloy catalyst supported on an acid-resistant support member, the catalyst comprising a catalytically effective amount of platinum-gallium alloy of up to about 50 atomic percent gallium, preferably about 5 to 50, more preferably about 10 to 30 atomic percent gallium, dispersed on a suitable carrier. In a still most preferred aspect, the balance of the alloy comprises platinum.

The catalyst employed as the electrocatalyst of the electrode of the invention may have any one or more of the other catalyst features described above. An acid resistant and wet proofing binder material may be used to bind the catalyst on the support member to comprise the electrode of the invention, which has particular utility as the cathode of an acid electrolyte fuel cell, more particularly as phosphoric acid electrolyte fuel cell.

DESCRIPTION OF THE PREFERRED EMBODIMENT

The catalyst of the present invention is a supported electrocatalyst in which fine crystallites of the platinum-gallium alloy are dispersed on a carrier which may be conductive carbon black, tungsten carbide, or any other carrier material suitable for the purpose.

A convenient method of manufacturing the catalyst is as follows. A powdered carrier material has platinum or platinum plus other platinum group metals dispersed thereon. Such material is conventionally prepared by an impregnating or adsorbing technique in which powder or fine particulate material, such as conductive carbon powder, is contacted with an aqueous solution or suspension of a platinum compound or platinum and other platinum group metal compounds, and then is heated at high temperature under a reducing atmosphere to reduce the metal compound(s) to the elemental metal. The production of platinum on carbon carrier catalysts by such techniques is well known in the art.

Generally, the impregnation technique is one in which only sufficient liquid to wet the particles is used. The adsorption technique employs an excess of the liquid solution or suspension relative to the amount of material being treated.

The platinum or platinum plus other platinum group metal may be adsorbed onto the carbon powder or other carrier material from an aqueous solution of an acid or salt such as chloroplatinic acid, a chloro-platinate, solubilized $H_2Pt(OH)_6$, or the like. Platinum adsorption is preferably carried out by use of solubilized $H_2Pt(OH)_6$, and this or other platinum compounds may be used in combination with other platinum group metal compounds. The carrier material is usually prewashed in mild acid and slurried in acidified deionized water containing a soluble compound of the catalytic metal or metals which are to be deposited thereon. A typical preparation is illustrated in Example 1 below.

The catalyst of the invention may be prepared by using as a starting material a conventional supported platinum catalyst made as briefly described above, although any other suitable techniques, such as simultaneous impregnation of a suitable carrier with platinum and gallium compounds, could be employed. When employing a conventional supported platinum catalyst as the starting material, the platinum catalyst may be contacted with a solution of a suitable gallium compound to deposit the latter thereon, then heated under reducing conditions at a temperature sufficiently high, and for a period of time sufficiently long, to reduce the gallium compound to the elemental gallium metal and to alloy at least a substantial portion of it with the platinum metal. As used herein and in the claims, the term alloy is used in its comprehensive, broad sense and includes intermetallic compounds and solid solutions of metals.

Gallium compounds, which are soluble in water and suitable for use in accordance with the present invention to be deposited onto a carbon or other carrier material, are gallium chloride, -fluoride, -nitrate, -perchlorate, -pentanedionate, and -sulfate. All these gallium salts are sufficiently water soluble to be used to prepare aqueous gallium contacting solutions. The chloride and nitrate are preferred inasmuch as they are currently less expensive than the other gallium salts.

A fuel cell electrode, for example a cathode, in accordance with the present invention, and one which is well suited for use in acid electrolyte fuel cells, particularly as the cathode in phosphoric acid electrolyte fuel cells, comprises (a) a support member such as wetproofed graphite paper, metal, tungsten carbide, silicon carbide or the like;

(b) a corrosion-resistant (in an oxygen and phosphoric acid environment), particulate or powder carrier material, such as conductive carbon black or tungsten carbide or the like;

(c) a supported platinum-gallium alloy catalyst dispersed on the carrier in the form of fine crystallites, and (d) a "wet-proof" binder to secure the supported catalyst particles to the support member.

The electrode of the invention may be made by first preparing the platinum-gallium supported catalyst. The supported catalyst particles are then combined with a binder such as a tetrafluoroethylene solution (for example, sold under the DuPont trademark Telfon) or other polymeric material, to provide a "wet-proof" and acid resistant binder for the supported catalyst particles, that is, a binder which will endure the acid and other conditions of an operating fuel cell. The binder and supported catalyst mixture is then deposited onto a suitable support member such as a graphite paper which has been wet-proofed with tetrafluoroethylene.

The platinum-gallium metal alloy will usually comprise from about 0.1 to 30%, preferably, about 4 to 20% and most preferably about 5 to 15%, all by weight, of the total weight of the carrier plus alloy. The platinum-gallium catalyst metal alloy should be present on the support member in a catalytically effective amount, which generally will be in the range of about 0.1 to 2 mg of the Pt-Ga alloy per $cm^2$ of area of the support member, preferably about 0.2 to 1 $mg/cm^2$, and most preferably, about 0.3 to 0.7 $mg/cm^2$.

Carrier materials suitable for use in the present invention are generally conductive carbon blacks such as materials sold under the trademarks Vulcan XC72R, XC72, or materials sold under the trademark Columbian Conductex, or the like. These carrier materials will generally have a surface area of from about 60–300 $m^2/g$ and a particle size of about 0.5–50 microns.

Deposition of the catalyst-coated carrier onto the support member is conveniently effected by suspending the carrier in a liquid such as water and directly depositing the wetted particles onto the support by filtration techniques, or alternatively, by applying it as a dry powder to a porous support and then wetting the surface by drawing water or electrolyte through the support.

The following examples illustrate the preparation and testing of illustrative embodiments of the invention.

EXAMPLE I (Preparation of Supported Pt Catalyst)

Eighty-one (81) grams of heat-treated conductive carbon black (Cabot Vulcan XC72R) having a surface area of 110 $m^2/g$ was slurried in 1,500 g of deionized water containing 4.0 g of glacial acetic acid. Six hundred grams of an aqueous solution of $H_2Pt(OH)_6$ containing 9.0 g of Pt was solubilized at room temperature with sufficient amine to raise the pH to 9.94. The platinum solution was then added to the slurry with constant stirring, as the slurry temperature was gradually raised to about 95° C. with the gradual addition of 50 g of 5% formic acid as a reducing agent. The slurry was kept at 95° C. for thirty minutes and then cooled to room temperature, filtered and washed with deionized water. The filter cake was then dried at 95° C. for sixteen (16) hours in flowing nitrogen to provide a platinum on carbon supported catalyst of 10 wt % Pt and having an overall surface area of 90 $m^2/g$.

EXAMPLE II (Preparation of Supported Pt-Ga Alloy Catalyst)

A platinum-gallium alloy catalyst supported on carbon was prepared in the following manner. Fifteen (15) g of the supported platinum catalyst of Example I was dispersed in 300 ml of distilled water. The mixture was blended at high speed for twenty (20) minutes. Fifty (50) g of an aqueous solution containing 0.27 g gallium as gallium nitrate was added to the slurry with constant stirring. After addition of the entire 50 g of solution, dilute ammonium hydroxide was added to the slurry until a pH of 7.0 was attained. Under these conditions, the gallium adsorbs on the supported platinum catalyst. Continuous stirring for thirty (30) minutes was carried out. The slurry was then filtered and the solids were dried at 95° C. in nitrogen and then heat treated at 900° C. in a flowing gas stream comprising 7 volume % $H_2$ (balance $N_2$) for two hours to form the platinum-gallium alloy catalyst. The formation of the Pt-Ga alloy was confirmed by x-ray diffraction. The surface area was found to be about 70 $m^2/g$ by cycle voltammetry, pulse CO chemisorption, and x-ray line broadening.

EXAMPLE III (Comparison Test as Oxygen Reduction Catalyst)

The Pt-Ga alloy catalyst prepared in accordance with Example II was tested as an oxygen reduction catalyst in a phosphoric acid fuel cell (105% $H_3PO_4$) operated at 350° F. The activity of the Pt-Ga alloy supported catalyst for the reduction of oxygen at 0.9 V was approximately 55% higher than that of a control Pt supported catalyst comprising the platinum on carbon catalyst material of Example 1.

EXAMPLE IV (Electrode Fabrication and Testing)

(A) Carbon supported platinum catalyst material of Example I (control) is ultrasonically dispersed in an aqueous tetrafluoroethylene solution (TEFLON® TFE-30). The catalyst/tetrafluoroethylene suspension is then precipitated out by addition of $AlCl_3$. The floc, having a composition of approximately 5% platinum, 50% carbon and 45% tetrafluoroethylene by weight, excluding water, is filtered onto a TEFLON® tetrafluoroethylene wetproofed graphite paper substrate to obtain a platinum loading of 0.46 mg/$cm^2$. The filter cake and paper are then dried, rolled and sintered at 360° C. for 15 minutes. The resulting cathode is identified as E-1.

(B) Step A is repeated except that the supported platinum-gallium alloy of Example II is utilized in place of the material of Example I. The resulting cathode is identified as E-2.

(C) Cathodes E-1 and E-2 are evaluated in identical single cell phosphoric acid test fuel cells at 191° C. (150 ASF), using $H_2$-air feed, and the results of 1000 hours of operation are set out in Table I.

TABLE I

| Cathode | Performance in millivolts, IR Free | | |
|---|---|---|---|
| Electrocatalyst | 200 Hours | 500 Hours | 1000 Hours |
| E-1 (Pt/C) | 674 | 666 | 652 |
| E-2 (Pt—Ga/C) | 700 | 691 | 684* |

*After 1350 hours, the Pt—Ga alloy catalyzed cathode was still maintaining 684 millivolts.

As can be seen, the Pt-Ga alloy catalyzed cathode E-2 demonstrated superior performance and improved stability over the control Pt catalyzed cathode E-1.

EXAMPLE V (Catalyst Stability Test)

In tests to determine the stability of the Pt-Ga alloy catalyst, Pt-Ga alloy catalyst prepared as in Example II and Pt control catalyst prepared as in Example I were immersed in 105% $H_3PO_4$ saturated with air at 204±5° C. for 72 hours. The Pt crystallite sizes were then measured by XRD line broadening. It was found that the Pt crystallite size of the control catalyst had increased to 68 Å in size, while the Pt particle size of the Pt-Ga alloy catalyst had increased only to 46 Å. It is clear that the sintering rate of the Pt-Ga alloy catalyst is much lower than that of the Pt catalyst.

Further, surprisingly, only about 10 wt % of the gallium initially contained in the Pt-Ga alloy dissolved out of the alloy catalyst. This unexpected stability of Pt-Ga alloy catalyst strongly correlated with the improved performance in the single cell fuel cell test.

EXAMPLE VI (Preparation of Supported Pt-Ga Alloy Catalyst)

The technique of Example II was repeated except that gallium chloride was used instead of gallium nitrate. The starting material platinum on carbon catalyst was one displaying a Pt surface area of 120 $m^2/g$, thus having platinum crystallites of higher surface area than the platinum catalyst of Example I. This enabled carrying out the reduction and alloying of the gallium with the platinum at a lower temperature of about 600° C. to provide a platinum-gallium alloy catalyst having a surface area of 95 $m^2/g$.

EXAMPLE VII (Surface Area Retention Test)

A platinum-chromium alloy supported catalyst was prepared by substantially following the procedure of Example II, except that chromium nitrate was substituted for the gallium nitrate of Example II. A sample of the platinum-gallium alloy catalyst of Example II and the platinum-chromium alloy catalyst of this Example VII were utilized to prepare electrodes generally in accordance with the procedure of Example IV.

The resultant cathodes were evaluated in identical single cell phosphoric acid test fuel cells at 191° C. and 150 ASF using $H_2$-air feed. The results of 2,000 hours of operation on the surface area retention of the catalyst is shown in Table II.

TABLE II

| Cathode | Alloy Surface Area ($m^2/g$) | |
|---|---|---|
| Electrocatalyst | Fresh | 2000 Hours |
| Pt—Ga Alloy | 77 | 61 |
| Pt—Cr Alloy | 97 | 40 |

It should be noted that the platinum chromium alloy initially had a higher surface area than the platinum-gallium alloy catalyst of the invention. However, after 2,000 hours of operation, the platinum-gallium alloy showed remarkably better surface area retention than did the platinum chromium alloy catalyst electrode.

While the invention has been described in detail with reference to specific preferred embodiments thereof, it will be apparent that upon a reading and understanding of the foregoing, numerous variations thereto will be readily envisioned by those skilled in the art. Such variations are believed to fall within the scope of the invention and the following claims.

What is claimed is:

1. A platinum group metal alloy electrocatalyst comprises a platinum-gallium alloy of up to about fifty atomic percent gallium dispersed on a suitable conductive carrier.

2. The electrocatalyst of claim 1 wherein said carrier comprises conductive carbon.

3. The electrocatalyst of claim 1 wherein the platinum-gallium alloy has a surface area of at least 30 $m^2g$.

4. The electrocatalyst of claim 1 wherein the platinum-gallium alloy comprises about 5 to 50 atomic percent gallium, balance platinum.

5. The electrocatalyst of claim 4 wherein the platinum-gallium alloy comprises about 10 to 30 atomic percent gallium and the platinum-gallium alloy has a surface area of at least about 30 $m^2/g$.

6. The electrocatalyst of claim 5 wherein the carrier comprises a conductive carbon powder.

7. The electrocatalyst of claim 1 wherein the platinum-gallium alloy comprises about 0.1 to 30% by weight of the total weight of the alloy plus carrier.

8. An electrode for an acid electrolyte fuel cell comprises a catalytically effective amount of a platinum group metal alloy catalyst supported on an acid-resistant support member, the catalyst comprising a platinum-gallium alloy of up to about 50 atomic percent gallium dispersed on a suitable conductive carrier.

9. The electrode of claim 8 wherein the electrode is oxygen reduction cathode.

10. The cathode of claim 9 wherein the carrier is a conductive carbon.

11. The cathode of claim 9 wherein the platinum-gallium alloy has a surface area of at least about 30 $m^2/g$.

12. The cathode of claim 9 wherein the platinum-gallium alloy comprises about 5 to 50 percent gallium, balance platinum.

13. The cathode of claim 12 wherein the platinum-gallium alloy comprises about 10 to 30 atomic percent gallium.

14. The cathode of claim 12 wherein the platinum-gallium alloy has a surface area of at least about 30 $m^2/g$.

15. The cathode of claim 12 wherein the platinum-gallium alloy comprises about 0.1 to 30% by weight of the total weight of the alloy plus carrier.

16. The cathode of claim 14 wherein the platinum-gallium alloy is dispersed on a carbon carrier and further including an acid resistant binder material binding the catalyst on the support member.

17. The cathode of claim 12 wherein the platinum-gallium alloy is present in an amount of about 0.1 to 2 mg of Pt-Ga alloy per square centimeter of support area surface.

18. A cathode for an acid electrolyte fuel cell comprises a catalytically effective amount of a platinum group metal alloy catalyst supported on an acid-resistant support member, the catalyst comprising a platinum-gallium alloy of about 5 to 50 atomic percent gallium dispersed on a suitable conductive carrier, the platinum-gallium alloy being present in an amount of about 0.1 to 2 mg of Pt-Ga alloy per square centimeter of support member surface.

19. The cathode of claim 18 wherein the platinum-gallium alloy comprises about 10 to 30 atomic percent gallium, balance platinum, the alloy has a surface area of at least 30 $m^2/g$, and comprises from about 0.1 to 30% by weight of the total weight of the alloy plus carrier.

20. The cathode of claim 19 wherein the carrier of the platinum-gallium alloy catalyst comprises carbon particles, and further including an acid-resistant binder binding the catalyst to the support member.

21. The electrocatalyst of claim 1, wherein said carrier is either carbon or tungsten carbide.

22. The electrode of claim 8, wherein the carrier is either carbon or tungsten carbide.

23. The cathode of claim 18, wherein the carrier is tungsten carbide or carbon.